Patented Oct. 23, 1951

2,571,992

UNITED STATES PATENT OFFICE 2,571,992

POLYVINYL BUTYRAL PRODUCT

Robert E. Cairns, Springfield, Mass., assignor to Shawinigan Resins Corporation, Springfield, Mass., a corporation of Massachusetts No Drawing. Application August 10, 1948, Serial No. 43,549

4 Claims. (Cl. 260—33.4)

This invention relates to the preparation of polyvinyl butyral organosols.

The preparation of organosols by admixing certain finely divided resinous materials with suitable organic liquids has recently become well-known to those skilled in the art of coating materials. Polyvinyl butyral organosols, however, have not been available and attempts to prepare such products using organic liquids suggested in conjunction with other resinous materials have not been successful.

It is an object of this invention to provide polyvinyl butyral organosols.

This and other objects are attained according to this invention by admixing finely divided polyvinyl butyral with ethylene glycol.

The following examples are illustrative of the present invention but are not to be construed as limitative thereof. Where parts are mentioned, they are parts by weight.

Example I

| | Parts |
|---|---|
| Polyvinyl butyral | 10 |
| Ethylene glycol | 50 |

The glycol is placed in a suitable vessel half filled with 1 inch flint stones. Thereafter, the polyvinyl butyral, which is in a finely divided state (less than 100 microns particle diameter) is added, the jar closed and placed on a tumbling machine. After milling the mixture for about a day, the product is removed from the vessel and is found to be a flowable, uniform dispersion of the polyvinyl butyral in the ethylene glycol. Microscopic examination of the organosol shows that the average diameter of the resin particles is 1–2 microns and the organosol exhibits Brownian movement. Furthermore, the organosol, while having thixotropic properties, shows no signs of instability on long standing.

Example II

| | Parts |
|---|---|
| Polyvinyl butyral | 10 |
| Ethylene glycol | 25 |

The polyvinyl butyral in finely divided form (less than 100 microns particle diameter) is mixed with the glycol to form a paste which may be applied to a suitable surface, e. g., wood, metal, etc., and the glycol evaporated by heating to form a continuous polyvinyl butyral film.

Example III

| | Parts |
|---|---|
| Polyvinyl butyral | 10 |
| Dibutyl sebacate | 4 |
| Ethylene glycol | 40 |

The above ingredients are thoroughly mixed, for example, in a ball mill as in Example I to form a readily flowable, dispersion of plasticized polyvinyl butyral in the glycol.

It is surprising that the use of ethylene glycol should lead to organosols of such high quality since in the past it has been considered necessary to use hydrocarbons for the purpose of forming organosols. However, it is found that organosols using glycol as the suspending medium are easier to prepare and are far more stable than those using hydrocarbons. It is further unexpectedly discovered that ethylene glycol is unique in the glycol series and other glycols such as diethylene glycol are not suitable.

In forming the organosols of the invention, it is usually found desirable to use at least 100 parts by weight of glycol for every 100 parts by weight of butyral resin. On the other hand, it is not generally desirable and may be uneconomical to use over 1000 parts of glycol for every 100 parts of butyral resin. Within these limits, the smaller amounts of glycol result in products of paste-like consistency and the larger amounts result in flowable resin suspensions.

The polyvinyl butyral resin used in the examples contains 17–22% hydroxyl groups by weight calculated as polyvinyl alcohol, less than 3% acetate groups by weight calculated as polyvinyl acetate and the balance substantially butyraldehyde acetal. However, other polyvinyl butyrals may be used containing ester, hydroxyl and acetal groups in other ratios.

According to one embodiment of the invention, the polyvinyl butyrals contain 5–30%, preferably 10–25%, hydroxyl groups by weight, calculated as polyvinyl alcohol, up to 30% ester groups by weight calculated as polyvinyl ester and the balance substantially butyraldehyde acetal.

In place of acetate groups, other ester groups may be present in the polyvinyl butyral, e. g., formate, propionate, butyrate, valerate, hexoate, benzoate, etc.

As indicated by the examples, plasticizers may be incorporated in the organosols. The nature and amount of plasticizer is governed by the properties desired in the finished resin and the influence of such additives is well-known to those skilled in the art. Examples of plasticizers include dibutyl sebacate, triethylene glycol dihexoate, etc. Usually 5–75 parts are used for every 100 parts of butyral resin.

In preparing the organosol, it is frequently desirable to include coloring matter such as dyestuffs and pigments, fillers, etc., e. g., wood flour, carbon black, zinc oxide, titanium dioxide, barytes as is common in plastics and coating materials.

Plasticizers, pigments, fillers and other additives may be incorporated with the butyral resin before admixture with the glycol or simultaneously with the glycol or in some cases subsequently to the formation of the organosol.

The polyvinyl butyral may be incorporated with the ethylene glycol by simply stirring the two components together. However, if especially stable organosols are desired, or if the butyral is not sufficiently small in particle size, the mixing step may be combined with further attrition of the butyral resin.

It is generally found that unexpectedly superior organosols result if the size of most of the butyral resin particles, i. e., 95% or more is below 100 microns and preferably below 10 microns. To achieve this result, the resin particles are reduced to this size either before or after incorporation with the glycol.

In preparing the organosols of the invention by mixing, ball milling, etc., the temperature of the mixture should be kept below about 35° C. When a ball mill is used, it may be equipped with balls of uniform or varying size. Flint, porcelain, steel or other suitable balls may be used. The grinding speed is dependent on the solids content of the charge, i. e., the viscosity of the mix as is apparent to those skilled in the art. The duration of the milling is dependent on the results desired, e. g., the production of an organosol of certain stability, of certain particle size or until the particles are no longer reduced in size.

Other mixing means involving mechanical attrition of the resin particles may be used in place of ball milling, if desired, as for example, subjection to the action of a colloid mill.

Another method of preparing the organosols of the invention is to admix the glycol with an aqueous dispersion or emulsion of polyvinyl butyral, followed by evaporation of the water from the resulting mixture, preferably while stirring the mixture. Such organosols are characterized by their free flowing characteristics (at relatively low solids content) and long storage life without settling of the butyral resin.

The organosols of the invention are especially suitable for coating purposes. Organosols formulated to be readily flowable at room temperature may be applied, for example, with a brush or doctor knife, while those formulated to be of paste-like consistency may be applied with a trowel, doctor knife or other suitable means. Such materials may be coated as paper, glass, wood, concrete, wire, fabric, leather, synthetic resin articles, e. g., vinyl resin sheets, metals, etc. to give a decorative and durable finish.

After application of the organosols, the glycol is preferably eliminated by heating, e. g., at 100–200° C. to deposit a continuous film of plasticized or unplasticized polyvinyl butyral, as the case may be.

Free films of butyral resin may also be prepared, if desired. One method is to deposit a layer of the organosol on a suitable surface, preferably, one to which the resin does not adhere firmly, e. g., cellophane or cellulose acetate plastic sheets, followed by the application of heat, e. g., 150° C. to remove the glycol and form a continuous gelatinized resin film. Finally, the resin film is stripped from the supporting surface. Films 0.003–0.1 inch in thickness which are transparent, flexible and durable may be readily prepared by this method.

It is obvious that many variations may be made in the products and processes of this invention without departing from the spirit and scope thereof as defined in the appended claims.

What is claimed is:

1. A composition of matter comprising a colloidal suspension of finely divided polyvinyl butyral resin in ethylene glycol in which at least 95% of the resin particles are less than 100 microns in diameter.

2. A composition as defined in claim 1 in which the butyral resin is associated with a plasticizer therefor.

3. A composition as defined in claim 1 in which 100–1000 parts of glycol are present for every 100 parts of butyral resin.

4. A composition as defined in claim 3 in which the resin has a particle size of not over 10 mu.

ROBERT E. CAIRNS.

REFERENCES CITED

The following references are of record in the file of this patent:

UNITED STATES PATENTS

| Number | Name | Date |
|---|---|---|
| 2,037,049 | Sager | Apr. 14, 1936 |

OTHER REFERENCES

"Synthetic Organic Chemicals," page 104, published by Carbide and Carbon Chemicals Corporation, twelfth edition, second printing July 1, 1946.